United States Patent
Andersson et al.

(10) Patent No.: US 7,370,870 B2
(45) Date of Patent: May 13, 2008

(54) DEVICE AND METHOD FOR CONTROLLING THE BRAKE OF A WALKING FRAME

(75) Inventors: Patrik Andersson, Anderstorp (SE); Sven-Inge Kjell, Anderstorp (SE); Joakim Andersson, Anderstorp (SE)

(73) Assignee: Volaris Sweden AB, Anderstorp (SE)

( * ) Notice: Subject to any disclaimer, the term of this patent is extended or adjusted under 35 U.S.C. 154(b) by 406 days.

(21) Appl. No.: 11/083,287

(22) Filed: Mar. 17, 2005

(65) Prior Publication Data

US 2005/0217409 A1 Oct. 6, 2005

(51) Int. Cl.
*F16C 1/14* (2006.01)

(52) U.S. Cl. .............................. 280/87.05; 280/87.041; 280/47.4; 280/647; 280/304.1; 280/85; 280/502.2; 280/489

(58) Field of Classification Search ............. 280/87.05, 280/47.4, 647, 304.1, 87.041, 85, 502.2, 280/489; 135/85; 74/502.2, 489
See application file for complete search history.

(56) References Cited

U.S. PATENT DOCUMENTS

| | | | | |
|---|---|---|---|---|
| 5,279,180 A | * | 1/1994 | Henriksson | 74/502.2 |
| 5,664,460 A | * | 9/1997 | Hewson | 74/502.2 |
| 5,865,065 A | * | 2/1999 | Chiu | 74/502.2 |
| 5,953,962 A | * | 9/1999 | Hewson | 74/502.2 |
| 6,053,068 A | * | 4/2000 | Yamashita et al. | 74/502.2 |
| 6,079,290 A | * | 6/2000 | Li | 74/502.2 |
| 6,202,502 B1 | * | 3/2001 | Chung-Che | 74/502.2 |
| 6,374,694 B1 | * | 4/2002 | Chen | 74/502.2 |
| 6,622,587 B1 | * | 9/2003 | Wu | 74/502.2 |
| 6,647,825 B1 | * | 11/2003 | Lin | 74/502.2 |
| 6,755,285 B1 | * | 6/2004 | Wu | 188/2 D |

\* cited by examiner

*Primary Examiner*—Christopher P. Ellis
*Assistant Examiner*—Cynthia F. Collado
(74) *Attorney, Agent, or Firm*—Fredrikson & Byron, P.A.

(57) ABSTRACT

The present invention relates to a device for controlling a brake (11) of a wheeled walking frame (10) provided with a handle (12), including a control device (25) movably connected to the brake (11) via a connector (24) for controlling the braking effect using hand power, the control device (25) being displaceable between an idle position without braking effect and at least one braking position for braking effect. The control device (25) is movably connected to a cover (23) of the handle (12), which cover (23) is designed for receiving and partially encasing the control device (25), the control device (25) being, in the idle position, at least partially retracted into the cover (23) so that the cover (23) and the control device (25) form the handle (25). Furthermore, the control device (25) is displaceable from the idle position further into the cover (23) to the braking position while effecting the connector (24). The present invention also relates to a method for controlling a brake (11) of a wheeled walking frame (10) provided with a handle (12).

15 Claims, 4 Drawing Sheets

DEVICE AND METHOD FOR CONTROLLING THE BRAKE OF A WALKING FRAME

CROSS REFERENCE TO RELATED APPLICATIONS

Figure 1:
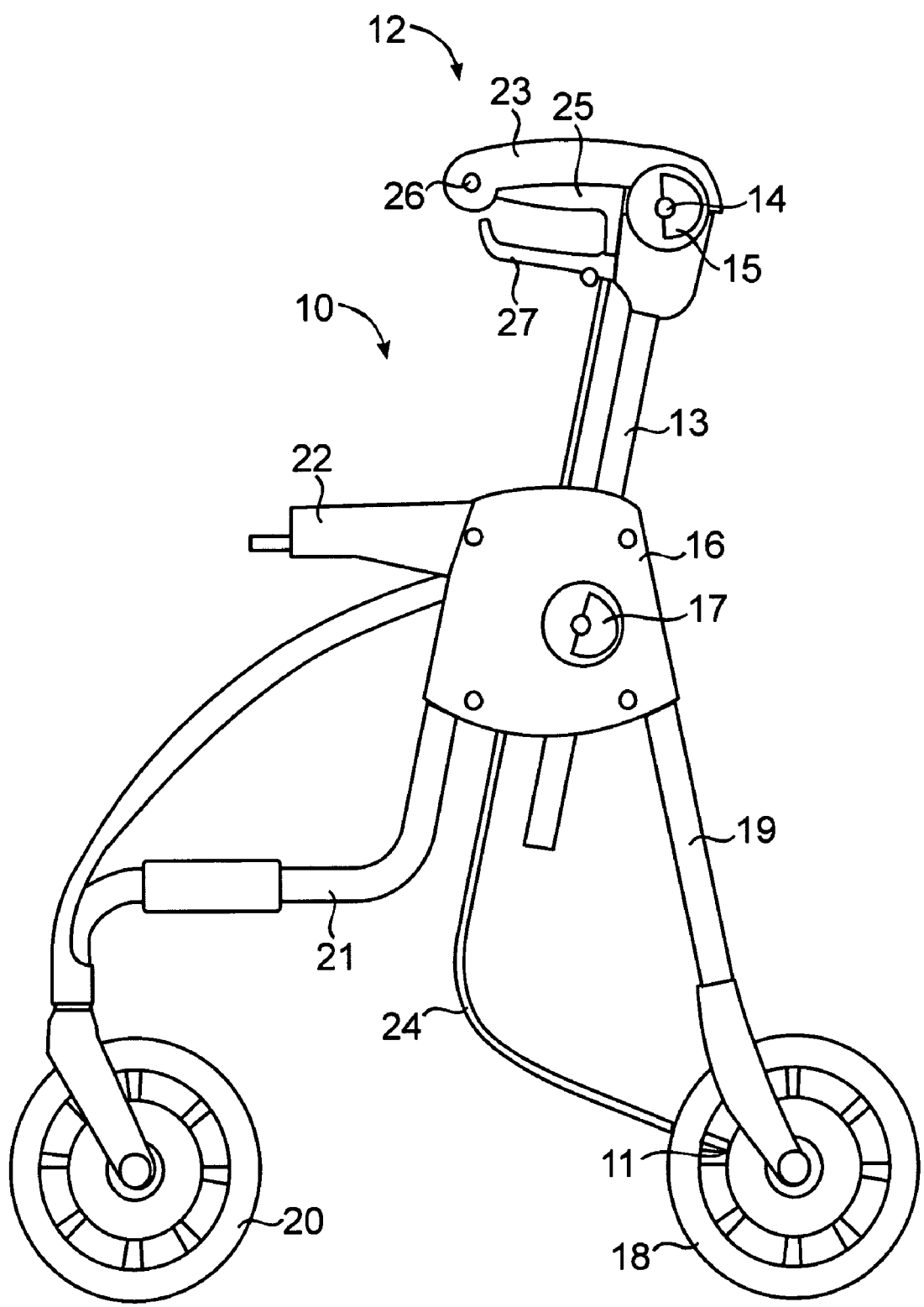

The present application claims priority to Swedish Patent Application No. 0400765-4 filed Mar. 25, 2004, the teachings of which are incorporated herein by reference.

FIELD OF THE INVENTION

The present invention relates to a device and a method for controlling a brake of a wheeled walking frame. In particular, the present invention relates to a device for controlling a brake of a wheeled walking frame provided with a handle, including a control device movably connected to the brake via a connector for controlling the braking effect using hand power, whereby the control device is displaceable between an idle position without braking effect and at least one braking position for braking effect. This intended type of devices is often used in connection with brakes of walking aids for functionally disabled people, such as handicapped, elderly or other people in need of assistance when moving.

BACKGROUND OF THE INVENTION

There are several different types of devices for controlling brakes of wheeled walking frames in the prior art. Such a type of device is shown and disclosed in U.S. Pat. No. 5,865,065. U.S. Pat. No. 5,865,065 shows and describes a hand-brake system for a wheeled walking frame, which hand-brake system includes a control device arranged at a handle of the walking frame for controlling the brake of the walking frame. The control device is connected to the brake via a steel wire, the brake being activated by the effect of the steel wire. The control device is designed in the form of a rotatable and closed loop, in which a user can insert the hand and turn the control device in the direction towards the handle for controlling the driving brake effect. Furthermore, the control device co-operates with a locking mechanism so that the control device can be rotated away from the handle to a parking-brake position and be locked there.

A problem with such prior-art devices for controlling brakes of wheeled walking frames is that the design may entail difficulties for a user when braking. For example, it may be difficult for a person with weak hands or impaired ability of the hands to use the brake. In the worst case, this leads to a user not being able to use the walking frame, which deprives the user of the possibility of walking with the aid thereof.

A disadvantage of prior-art wheeled walking frames with a device for controlling the brake is that they are unsafe for the user, which results in increased risk of accidents.

SUMMARY OF THE INVENTION

A purpose of the invention is to avoid the above disadvantages and problems of devices for controlling a prior-art brake of a wheeled walking frame. The device and the method for controlling a brake of a wheeled walking frame provided with a handle in accordance with the invention results in the possibility of braking in a simple and safe way. This is achieved by the device for controlling the brake being designed in such a way that a user can brake the walking frame using hand power without changing the grip and without releasing the handle. The device according to the invention also results in people with weak hands or with impaired ability of the hands being able to perform braking, as a consequence of the fact that braking can be performed without changing the grip and through relatively small movements of the hand. Furthermore, the invention results in safer braking because braking can be performed through a smaller movement of the hand without changing the grip, which is an essential safety detail, for example, for users suffering from dementia. Consequently, a device for wheeled walking frames is achieved which can be used also by people with further problems or functional disabilities in a comfortable, safe and effective way, which results in more people being able to use wheeled walking frames as walking aids.

A further purpose of the present invention is to provide a hand-brake system for a wheeled walking frame, including a control device for controlling braking effect, which control device is arranged in such a way that the user, when in motion, always or continuously has the control device in the hand. Thus, the user never needs to fumble for a handbrake lever in order to brake the walking frame. With the invention, braking can instead be performed by the user squeezing the handle.

A further purpose of the present invention is to provide a wheeled walking frame including the device for controlling the brake.

According to an embodiment of the invention, there is provided a device for controlling a brake of a wheeled walking frame provided with a handle, including a driving brake controllable by using the control device, and a parking brake, whereby a locking mechanism in co-operation with the control device results in the possibility of locking the control device in a parking-brake position and of terminating the parking-brake function by braking, i.e., by the user squeezing the handle so that the control device is moved into a driving brake position. This also results in a safer termination of the parking-brake function because the termination is performed by moving from the parking-brake position to the driving brake position, whereupon the user, slowly in a smooth changeover, can release the control device to an idle position without braking effect. According to an embodiment of the invention, such a locking mechanism is achieved.

The device according to the invention includes a device for controlling a brake of a wheeled walking frame provided with a handle, including a control device movably connected to the brake via a connector for controlling the braking effect using hand power, whereby the control device is displaceable between an idle position without braking effect and at least one braking position for braking effect, characterised in that the control device is movably connected to a cover of the handle arranged for receiving and partially encasing the control device, the control device in the idle position being at least partially retracted into the cover so that the cover and the control device form the handle, and that the control device is displaceable from the idle position further into the cover to the braking position while effecting the connector.

The handle can include a first side or a bottom side with the control device and an opposite second side or top side with the cover, the control device and the cover forming a natural hand grip so that a user automatically holds the control device in the hand when the handle is grasped. The control device can thus include a land portion for contact with a user's fingers, and the cover can include a land area for contact with the base of a user's thumb so that a user's fingers are in contact with the control device as the user grasps the handle. This is a great advantage and an essential safety detail for people with different types of impaired ability because braking can be performed without the user needing to search or fumble for the control device and can brake by squeezing the handle, which can be an instinctive reaction to danger or when problems arise.

The control device can be displaceable from the idle position and further into the cover to a driving brake position for driving brake effect and a parking-brake position for parking-brake effect, whereby the control device using a releasable locking mechanism in the form of a parking-brake lever or the equivalent can be locked in the parking-brake position. The parking-brake position is, for example, an intermediate position between the idle position and a driving brake position for maximum driving brake effect. The locking mechanism can be arranged so that the parking-brake function is terminated by the control device being moved in the direction towards the driving brake position for maximum driving brake effect. Thus, the parking-brake function can be terminated by a user squeezing the handle, whereby the walking frame is still immobile. The control device is subsequently released back to the idle position at the desired rate. In that way, a safer device is achieved, which avoids a sudden changeover between the parking-brake position and the idle position.

The control device can be rotatably connected to the cover and a frame around a joint at a free end of the handle, and the parking-brake lever can be rotatably connected to the frame around a joint device in a central portion of the parking-brake lever. The control device and the parking-brake lever can be spring-loaded in the direction towards the idle position. A free end of the control device can include a locking device for co-operation with a pin at one end of the parking-brake lever so that the control device, by the use of the parking-brake lever, can be moved to the parking-brake position and locked therein. The locking device can include a notch for receiving the pin and a slide surface arranged adjacent to the notch for contact against the pin so that turning the parking-brake lever results in the pin following the slide surface for a corresponding rotation of the control device into the cover, the pin forcing the control device upwards around the joint until the pin protrudes into the notch, locking the control device in the parking-brake position. The locking device with the notch and the parking-brake lever with the pin form the locking mechanism. As a consequence of the control device and the parking-brake lever being limited regarding mobility of rotation around the joint and the joint device, respectively, the pin is constrained from receding from the notch.

The method according to the invention includes the steps for grasping the handle and for displacing a control device movably connected to the brake via a connector for controlling the braking effect using hand power between an idle position without braking effect and at least one braking position for braking effect, characterised by the steps of the user automatically grasping the control device as the handle is grasped, the control device together with a cover arranged for receiving and partially encasing the control device forming the handle, and of the control device displacing, from the idle position, where the control device is at least partially retracted into the cover, further into the cover to the braking position while effecting the connector in order to provide braking effect.

Further characteristics and advantages of the present invention will become clear from the below description of embodiments, appended drawings and dependent claims.

SHORT DESCRIPTION OF THE DRAWINGS

Figure 2:
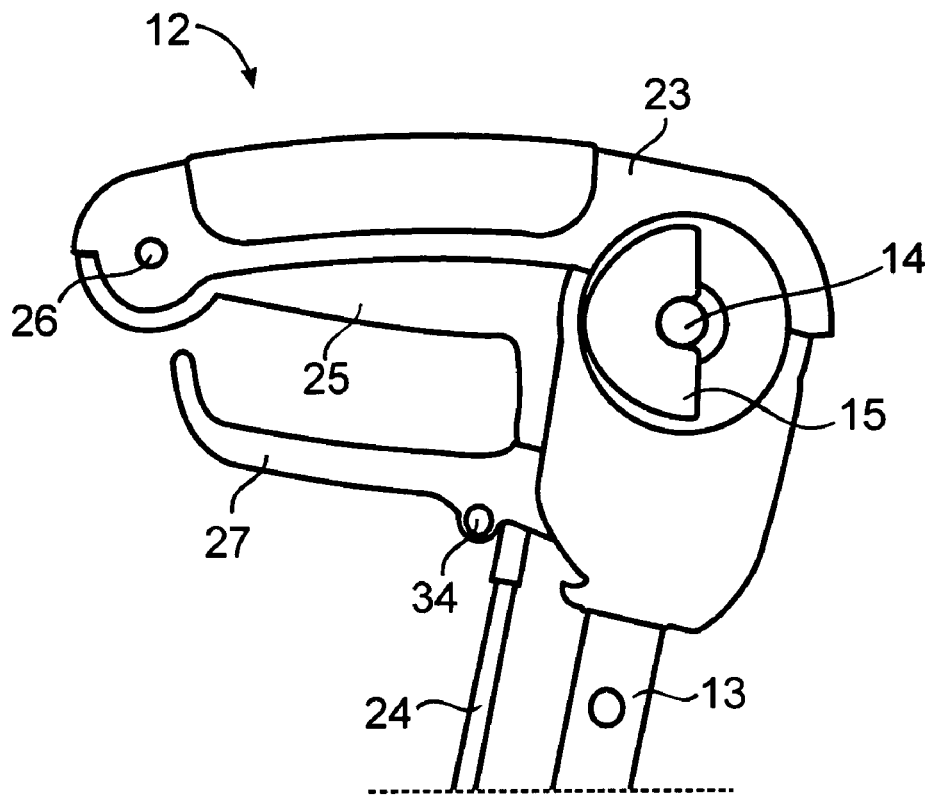
Figure 3:
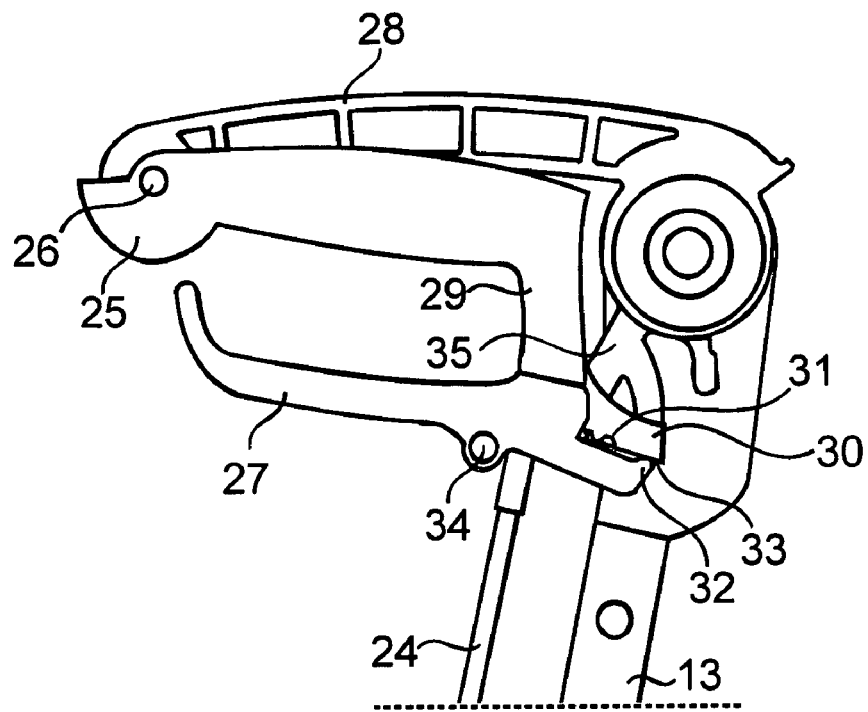
Figure 4:
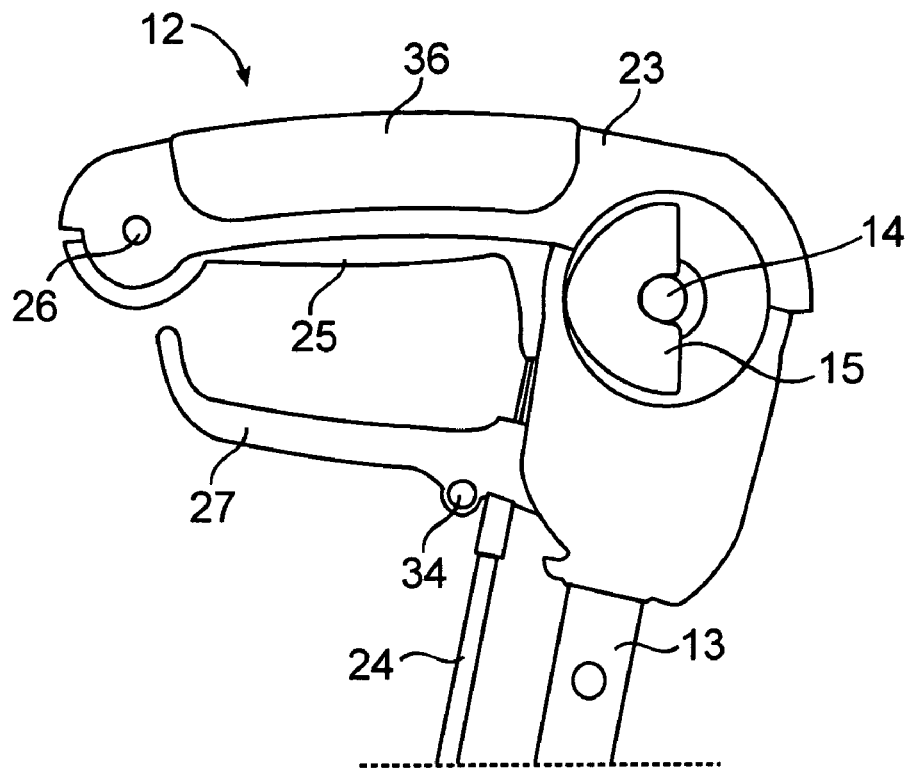
Figure 5:
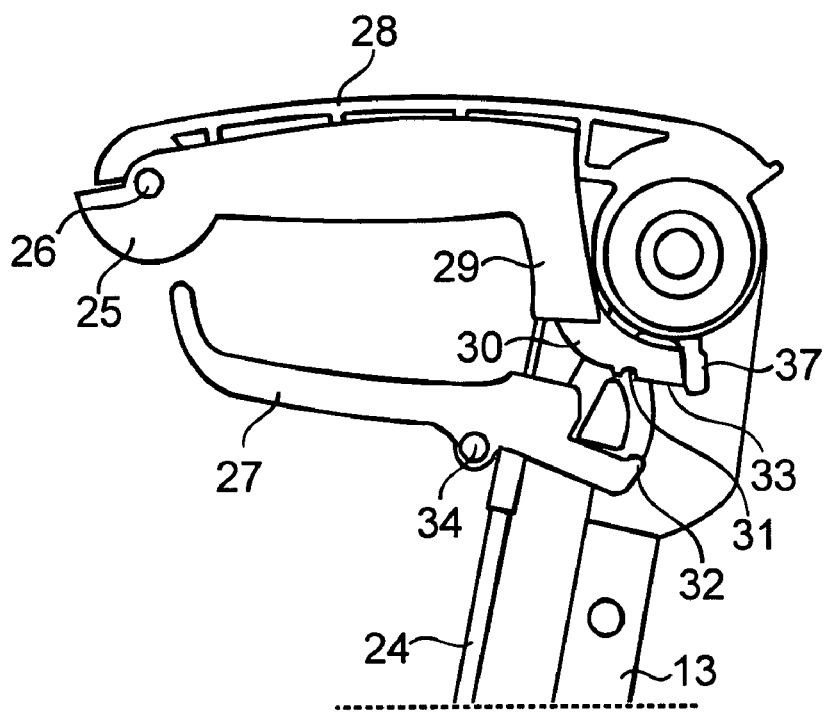
Figure 6:
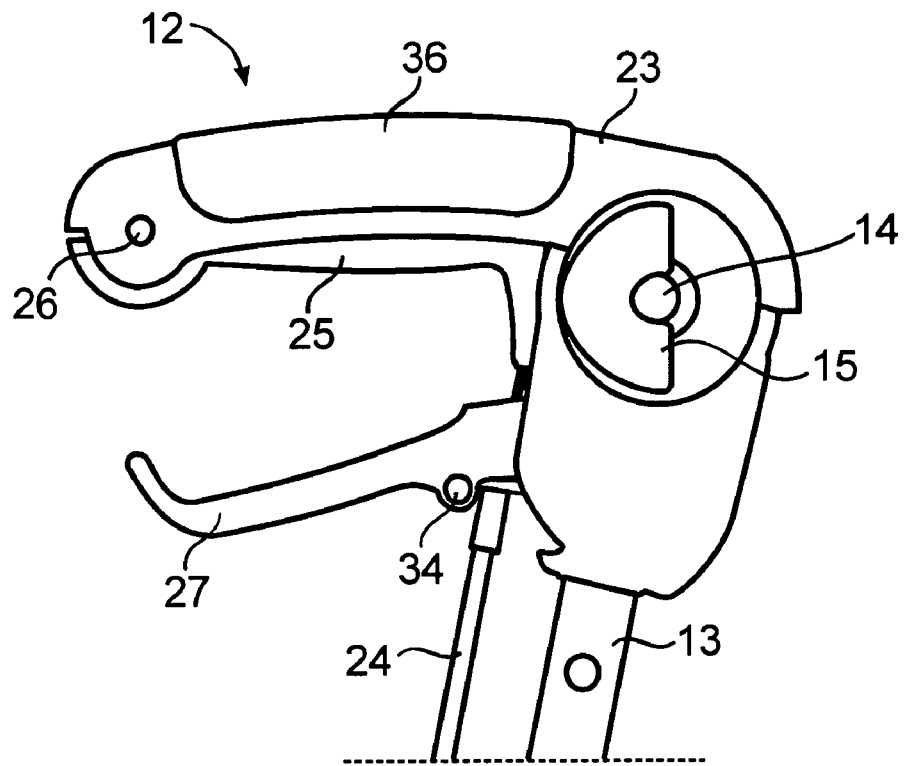
Figure 7:
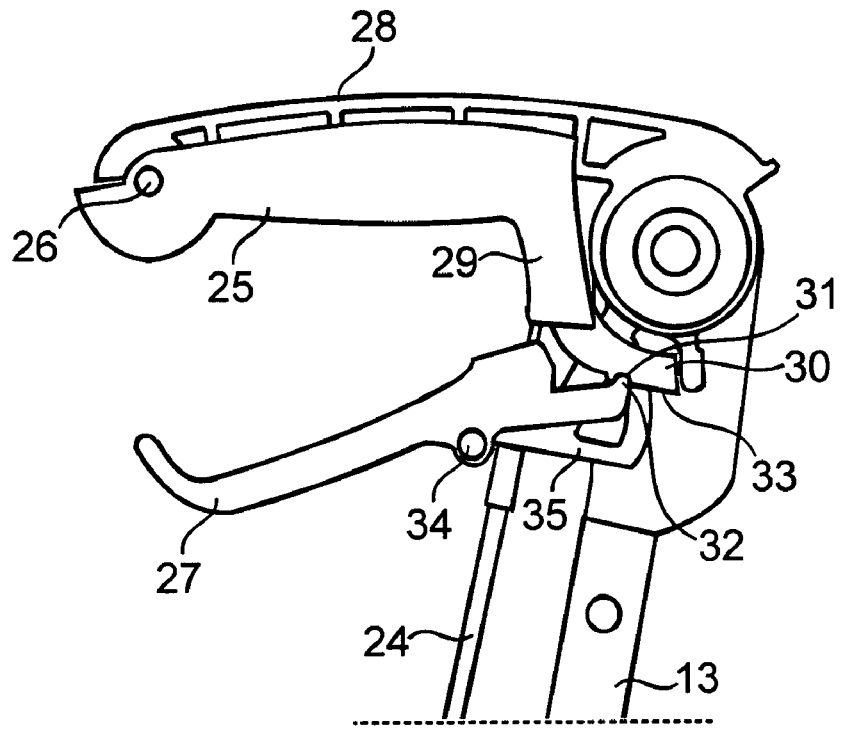

The invention will now be more closely described using embodiments referring to appended drawings, in which FIG. 1 is a schematic side elevational view of a wheeled walking frame with a device for controlling a brake according to an embodiment of the invention, FIG. 2 is a schematic side elevational view of a handle of the walking frame, showing the control device of the handle in an idle position without braking effect and a parking-brake lever of the device according to an embodiment of the invention, FIG. 3 is a schematic side elevational view according to FIG. 2 with the cover removed in order to show the co-operation of the control device with the parking-brake lever and the locking mechanism in the idle position, FIG. 4 is a schematic side elevational view of the handle, showing the control device of the handle in a driving brake position for driving brake effect, FIG. 5 is a schematic side elevational view according to FIG. 4 with the cover removed in order to show the control device, the parking-brake lever and the locking mechanism in the driving brake position, FIG. 6 is a schematic side elevational view of the handle, showing the control device of the handle in a parking-brake position for parking-brake effect and the parking-brake lever in a locked position for locking the control device in the parking-brake position, and FIG. 7 is a schematic side elevational view according to FIG. 6 with the cover removed in order to show the co-operation of the control device with the parking-brake lever and the locking mechanism in the parking-brake position.

THE INVENTION

Referring to FIG. 1, a walking aid in the form of a wheeled walking frame 10 is illustrated, with a device for controlling a brake 11 according to an embodiment of the present invention. The walking frame 10 includes a handle 12 to be grasped and encased by a user's hand while walking with the walking frame 10. The handle 12 is rotatably connected to a vertically slidable rod 13 so that the handle 12 is adjustable with regard to angle and height. The handle 12 is rotatably connected to the rod 13 via a joint member 14 and can be locked at the desired angle using a first locking device 15. The rod 13 is movably connected to a frame 16 so that the rod 13 is slidable vertically and can be locked in the desired position using a second locking device 17. The frame 16 includes a first leg 19 provided with a first wheel 18 and a second leg 21 provided with a second wheel 20. Furthermore, the frame 16 includes a third leg provided with a third wheel, a fourth leg provided with a fourth wheel, and is connected to a further rod terminating in a further handle, which is not shown in the drawings. For example, the walking frame 10 thus includes four wheels. Alternatively, the walking frame includes three wheels or another appropriate number of wheels. For example, the wheels are solid or provided with air-filled tires. According to an embodiment of the invention, one or several wheels are rotatably arranged in order to enable steering of the walking frame 10. According to an embodiment of the invention, the frame 16 is provided with a board 22 in the form of a tray or a seat. As a further example, the walking frame 10 is collapsible so that it can be folded together while simultaneously folding the board 22.

The handle 12 includes a cover 23 and a control device 25 connected to the brake 11 via a connector 24 for application and control of the braking effect depending thereupon. The cover 23 is connected to the rod 13 and is arranged for contact against a user's hand or the base of a user's thumb so that a user can lean against the cover 23 while walking with the walking frame 10. For example, the cover 23 is fixedly connected to the rod 13. According to an embodiment of the invention, the cover 23 is arranged on a side of the handle 12 while the control device 25 is arranged on the opposite side thereof. For example, the cover 23 is arranged on a top portion of the handle 12 or a top side of the handle 12 while the control device 25 is arranged on a lower portion of the handle 12 or a bottom side of the handle 12. Thus, the handle 12 is designed so that a user, in that the control device 25 and the cover 23 together form the handle 12, automatically grasps the control device 25 as the handle 12 is grasped. The cover 23 is hollow or designed with a space for receiving the control device 25 so that the control device 25 can be displaced into the cover 23, which is more closely described below.

The control device 25 is movably connected to the cover 23 so that the control device 25 is displaceable into the cover 23 by the simultaneous effect of the connector 24 in order to accomplish braking, which is more closely described below. According to the embodiment shown in FIG. 1, the control device 25 is rotatably connected to the cover 23 using a joint 26 so that the control device 25 is rotatable around the joint 26 into the cover 23. The joint 26 is arranged at a free end of the handle 12. The joint 26 is arranged at an end of the control device 25, the opposite end being rotatable around the joint 26. Thus, the control device 25 is movably connected to the brake 11 via the connector 24, thereby forming a hand-brake system. For example, the connector 24 is designed as a wire connected to the control device 24, the braking effect being achieved by the retraction of the wire using the control device 25. For example, the connector 24 is connected to an end of the control device 25 opposite the joint 26 so that the connector 24 follows the rotation of the control device 25 around the joint 26. A parking-brake lever 27 is arranged to accomplish, in co-operation with the control device 25, a parking-brake function, which is more closely described below.

The brake 11 is arranged at at least one wheel 18, 20. For example, the brake is arranged at the first wheel 18 and/or the third wheel of the walking frame 10. According to an embodiment of the invention, the brake 11 is designed as a drum brake. Alternatively, the brake 11 is designed as a disc brake, sliding brake or other type of conventional brake.

Referring to FIG. 2, the cover 23 and control device 25 of the handle are shown in an idle position without braking effect according to an embodiment of the invention. Furthermore, FIG. 2 shows the device's parking-brake lever 27. The handle 12 includes the cover 23 and the control device 25, the control device 25 and the cover 23 forming the handle 12. In the idle position, the control device 25 is retracted into the cover 23 so that a user's hand is caused to come into contact with the control device 25 as the handle 12 is grasped. Thus, a user is forced to grasp the control device 25 when walking with the aid of the walking frame 10, i.e., a user is caused to automatically grasp the control device 25 when the handle 12 is grasped. In the shown embodiment, the parking-brake lever 27 is arranged under the control device 25 and the handle 12.

Referring also to FIG. 3, the cover 23 is removed and a locking mechanism of the device is exposed in order to show the co-operation of the control device 25 with the parking-brake lever 27 in the idle position.

The control device 25 is rotatably connected via the joint 26 to a frame 28 connected to the rod 13. Furthermore, the control device 25 is rotatably connected to the cover 23 via the joint 26, as described above. The control device 25 is, at a first end, rotatably connected to the frame 28. A second end of the control device 25 is provided with a protruding portion 29 which protrudes in the direction towards the parking-brake lever 27 in order to rest, in the idle position, against a land area of the parking-brake lever 27, thereby forming a stop for the control device. For example, the control device is 25 spring-loaded so that it is forced in the direction towards the parking-brake lever 27 and the idle position.

The protruding portion 29 is provided with a locking device 30, which locking device 30 is provided with a notch 31 for receiving a pin 32 of the parking-brake lever 27 so that the control device 25 can be locked in the parking-brake position, which is more closely described below. For example, the locking device 30 is designed in the form of a member provided with the notch 31, which member protrudes in an arch from the protruding portion 29 of the control device 25. In the idle position, the pin 32 is in contact with a slide surface 33 of the locking device 30, which surface is arranged adjacent to the notch 31.

The parking-brake lever 27 is arranged rotatably around a joint device 34, whereby a first end of the parking-brake lever 27 is free, a second end of the parking-brake lever 27 is provided with the pin 32 and the joint device 34 is arranged therebetween. The parking-brake lever 27 is suspended in a suspension arrangement 35 connected to the frame 28 and is rotatably connected to the suspension arrangement 35 via the joint device 34.

Referring to FIG. 4, the control device 25 of the handle is shown in a driving brake position for driving brake effect or a driving brake position for maximum driving brake effect. In the driving brake position, the control device 25 is displaced into the cover 23, whereby application for driving brake effect is performed by moving or rotating the control device 25 further into the cover 23. Thus, the control device 25 is displaceable from the idle position further into the cover 23 to a braking position in the form of the driving brake position, whereby the connector 24 connected to the control device 25 is affected during the displacing motion. When a user squeezes the handle 12, the control device 25 is rotated around the joint 26, whereby the connector 24 affects the brake 11 so that driving brake effect is achieved.

In the embodiment shown in FIG. 4, the cover 23 is provided with a lining 36 in order to present a more comfortable and secure grip for a user. For example, the lining 36 includes padding, a rubber lining or similar in order to provide a soft and non-slip grip.

Referring also to FIG. 5, the cover 23 is removed in order to show the control device 25, the parking-brake lever 27 and the locking mechanism in the driving brake position or a driving brake position for maximum driving brake effect. In order to accomplish driving brake effect, the control device 25 is rotated around the joint 26 and into the cover 23, bringing the protruding portion 29 and the locking device 30 in the same direction while the parking-brake lever 27 also maintains its original position. The control device 25 is rotated from the idle position into the cover 23 a distance corresponding to the desired applied force. At the maximum braking effect, for example, a free end of the locking device 29 is in contact with a stop 37 arranged at the frame 28 and designed for contact against the free end of the locking device 29. According to an embodiment of the invention, the device includes a transmission device, which is not shown in the drawings, in order to transform a minor or weak rotation of the control device 25 to a more powerful braking effect.

Referring to FIG. 6, the control device 25 of the handle 12 is shown in a parking-brake position for parking-brake effect and the parking-brake lever 27 in a locked position for locking the control device 25 in the parking-brake position. In the parking-brake position, the control device 25 is displaced into the cover 23. The parking-brake position is a position of the control device 25 between the idle position and the driving brake position for maximum driving brake effect.

Also referring to FIG. 7, the cover 23 is removed in to reveal the co-operation of the control device 25 with the parking-brake lever 27 and the locking mechanism in the parking-brake position, whereby the control device 25 is in the parking-brake position and the parking-brake lever 27 is in the locked position. In order to move the control device 25 to the parking-brake position, the parking-brake lever 27 is rotated downwards in FIG. 7 from its idle position around the joint device 34, causing the pin 32 to force the locking device 30 upwards in the direction towards the cover 23 so that the control device 25 is rotated around the joint 26 and slid into the cover 23 by the simultaneous effect of the connector 24. During the rotation of the parking-brake lever 27, the pin 32 is moved along the slide surface 33 in the direction towards the notch 31 while the control device 25 is simultaneously displaced towards the parking-brake position. When the pin 32 reaches the notch 31, the pin is slid into the notch 31, thereby locking the control device 25 in the parking-brake position and the parking-brake lever 27 in the locked position. In the parking-brake position, the locking device 30 of the parking-brake lever 27 has been forced upwards in the direction towards the cover 23, bringing along the protruding portion 29 and the control device 25 so that the control device 25, in the parking-brake position, is displaced into the cover 23. Since the control device 25 is spring-loaded for rotation around the joint 26 back to the idle position and the parking-brake lever 27 is only rotatable around the joint device 34, the pin 32 is forced into a fixed position in the notch 31. For example, the parking-brake lever 27 is spring-loaded in a conventional way in order to spring-load the parking-brake lever 27 in the direction towards the idle position so that the parking-brake lever 27 strives to assume the idle position.

In order to release the locking mechanism, the control device 25 is moved or rotated from the parking-brake position in the direction towards the driving brake position for maximum driving brake effect, or it is rotated upwards around the joint 26 in FIG. 7, the locking device 30 following so that the pin 32 leaves the notch 31, and the parking-brake lever 27 resumes the idle position as a result of the spring-loading. Thus, the control device 25 is moved from the parking-brake position to the driving brake position when the locking mechanism is released, whereupon the control device 25 can be released to the idle position at the desired rate for a smooth changeover between the parking-brake position and the idle position

The invention claimed is:

1. A device for controlling a brake of a wheeled walking frame provided with a handle, the device comprising a control device, being movably connected to the brake via a connector, for controlling the braking effect using hand power, the control device being displaceable between an idle position without braking effect and at least one braking position for braking effect, wherein the control device is movably connected to a cover of the handle, which cover is designed for receiving and partially encasing the control device, the control device, in the idle position, being at least partially retracted into the cover so that the cover and the control device form the handle, and the control device being displaceable from the idle position further into the cover to the braking position while effecting the connector.

2. A device according to claim 1, wherein the handle includes a bottom side with the control device, which control device includes a land portion for contact against a user's fingers, and an opposite top side with the cover, which cover includes a land area for contact against the base of a user's thumb so that a user's fingers are in contact with the control device when the user grasps the handle.

3. A device according to claim 1, wherein the control device at an end and via a joint is rotatably connected to the cover at a free end of the handle and wherein an opposite end of the control device is rotatable around the joint.

4. A device according to claim 1, wherein the control device is displaceable from the idle position and further into the cover to a driving brake position for driving brake effect and a parking-brake position for parking-brake effect.

5. A device according to claim 4, wherein the parking-brake position is an intermediate position between the idle position and the maximum driving brake position.

6. A device according to claim 5, wherein the control device co-operates with a locking mechanism to releasably lock the control device in the parking-brake position.

7. A device according to claim 6, wherein the control device is connected to a locking device including a notch for receiving a pin of a parking-brake lever, the locking device with the notch and the parking-brake lever with the pin forming the locking mechanism.

8. A device according to claim 7, wherein the parking-brake lever is rotatably connected to a suspension arrangement connected to the handle so that the parking-brake lever is rotatable from an idle position to a locked position where the pin co-operates with the notch.

9. A device according to claim 8, wherein the locking device includes a slide surface arranged adjacent to the notch for contact against the pin and for sliding the locking device and the control device towards the parking-brake position as the parking-brake lever is rotated to the locked position.

10. A device according to claim 9, wherein the locking device is connected to the control device so that the locking device with the notch follows the control device during rotation from the parking-brake position in the direction towards a driving brake position for maximum braking effect during simultaneous release of the locking mechanism.

11. A method for controlling a brake of a wheeled walking frame provided with a handle, including the steps for grasping the handle and displacing a control device movably connected to the brake via a connector for controlling the braking effect using hand power between an idle position without braking effect and at least one braking position for braking effect, and further including the steps of a user automatically grasping the control device as the handle is grasped, due to that the control device together with a cover arranged for receiving and partially encasing the control device form the handle, and of displacing the control device from the idle position, where the control device is at least partially retracted into the cover, and further into the cover to the braking position while effecting the connector in order to provide braking effect.

12. A method according to claim 11, wherein the control device is displaced from the idle position into the cover to a driving brake position for driving brake effect or a parking-brake position for parking-brake effect.

13. A method according to claim 12, wherein the control device is moved by rotation around a joint.

14. A method according to claim 13, wherein a parking-brake lever is rotated around a joint device so that a pin of the parking-brake lever is moved along a slide surface of a locking device connected to the control device so that the control device is moved to the parking-brake position where a notch in the locking device receives the pin in order to lock the control device in the parking-brake position.

15. A method according to claim 14, wherein the locking device is released from the pin by rotation of the control device in the direction away from the pin.

* * * * *